United States Patent
Yang et al.

(10) Patent No.: US 12,416,505 B2
(45) Date of Patent: Sep. 16, 2025

(54) DRIVING ROUTE PLANNING METHOD, ELECTRONIC DEVICE AND STORAGE MEDIUM

(71) Applicant: HON HAI PRECISION INDUSTRY CO., LTD., New Taipei (TW)

(72) Inventors: Jung-Hao Yang, New Taipei (TW); Chin-Pin Kuo, New Taipei (TW); Chih-Te Lu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 246 days.

(21) Appl. No.: 18/109,534

(22) Filed: Feb. 14, 2023

(65) Prior Publication Data

US 2024/0167832 A1 May 23, 2024

(30) Foreign Application Priority Data

Nov. 21, 2022 (CN) .......................... 202211456614.1

(51) Int. Cl.
*G01C 21/34* (2006.01)
*G01C 21/36* (2006.01)
*G06N 3/08* (2023.01)

(52) U.S. Cl.
CPC ..... *G01C 21/3484* (2013.01); *G01C 21/3602* (2013.01); *G06N 3/08* (2013.01)

(58) Field of Classification Search
CPC .................................. G01C 21/00; G06N 3/00
See application file for complete search history.

(56) References Cited

U.S. PATENT DOCUMENTS

| | | | |
|---|---|---|---|
| 11,797,889 B1* | 10/2023 | Ahn | G06F 3/012 |
| 2019/0129429 A1* | 5/2019 | Juelsgaard | G01S 17/00 |
| 2020/0250486 A1* | 8/2020 | Kim | G06N 3/088 |
| 2021/0026887 A1* | 1/2021 | Fukushima | G06F 16/7837 |
| 2021/0201504 A1* | 7/2021 | Xu | G05D 1/0221 |
| 2021/0213959 A1* | 7/2021 | Shahriari | G05D 1/0088 |
| 2022/0026221 A1* | 1/2022 | Tian | G06N 3/08 |
| 2023/0415772 A1* | 12/2023 | Wolff | B60W 60/0011 |
| 2023/0419080 A1* | 12/2023 | Choi | G06N 3/0455 |
| 2023/0419678 A1* | 12/2023 | Kabkab | G06V 20/58 |
| 2024/0028903 A1* | 1/2024 | Ancora | G01S 17/86 |
| 2024/0095578 A1* | 3/2024 | Chen | G06N 3/094 |
| 2024/0096155 A1* | 3/2024 | Sachdeva | G07C 9/28 |

* cited by examiner

*Primary Examiner* — Aniss Chad
*Assistant Examiner* — Elizabeth J Slowik
(74) *Attorney, Agent, or Firm* — ScienBiziP, P.C.

(57) ABSTRACT

A driving route planning method applied to an electronic device is provided. The method includes acquiring an image when a vehicle is driving. Target route information is obtained by inputting the image into a target route planning model. Once a first embedding vector of the target route information is extracted, a driving route corresponding to a driving style is obtained by inputting the first embedding vector into a target driving style model.

11 Claims, 4 Drawing Sheets

DRIVING ROUTE PLANNING METHOD, ELECTRONIC DEVICE AND STORAGE MEDIUM

FIELD

The present disclosure relates to autonomous driving technology field, in particular to a driving route planning method, an electronic device and a storage medium.

BACKGROUND

A vehicle's automatic driving system (ADS) needs to set a motion trajectory planning of the vehicle during driving. With traditional technologies, a motion trajectory planning network is usually used to plan a driving route of the vehicle. Such methods usually generate the driving route according to an uniform driving rule, for example, when an obstacle is encountered on a road, the vehicle is given a priority to avoid the obstacle from a left side. However, in real life driving scenarios, there are many uncertainties of the vehicle and the road, which makes it very difficult to accurately plan the driving route, thereby affecting a driving experience or a driving safety.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

It should be noted that in the present disclosure, "at least one" refers to one or more, and "a plurality of" refers to two or more than two. "And/or" describes the association relationship of associated objects, indicating that there can be three types of relationships, for example, A and/or B can mean: A exists alone, A and B exist simultaneously, and B exists alone, where A, B can be singular or plural. The terms "first", "second", "third", "fourth", etc. (if any) in the description and claims of this disclosure and the drawings are used to distinguish similar objects, not to describe a designed order or sequence.

In order to better understand the driving route planning method and related devices provided by the embodiments of the present disclosure, an application scenario of the driving route planning method of the present disclosure is firstly described below.

Figure 1:
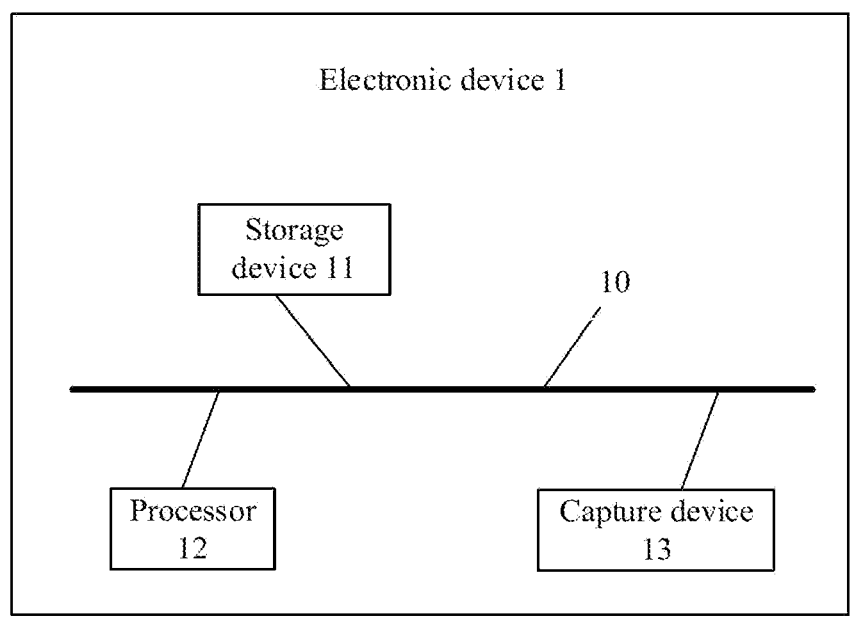
FIG. 1 is a schematic diagram of an application scenario of a driving route planning method provided by an embodiment of the present disclosure.

FIG. 1 is a schematic diagram of an application scenario of a driving route planning method provided by an embodiment of the present disclosure. The driving route planning method provided by the embodiments of the present disclosure is applied to an electronic device 1, the electronic device 1 can include, but is not limited to, a storage device 11, at least one processor 12, and a capture device 13 connected to each other through a communication bus 10. The capture device 13 may be a vehicle-mounted capture device of a vehicle or a capture device such as a camera externally connected to the vehicle, to capture a plurality of images or videos of a scene in front of the vehicle.

FIG. 1 is only an example of the electronic device 1 and does not constitute a limitation to the electronic device 1. The electronic device 1 may include more or fewer components than shown in the figure, or combine certain components, or different components, for example, the electronic device 1 may further include an input device and an output device, network access devices, and the like.

In the embodiment of the present disclosure, the electronic device 1 is applied in a vehicle, for example, ay be a vehicle-mounted electronic device in the vehicle, or it may be an independent electronic device capable of communicating with vehicle-mounted devices and performing data interaction with the vehicle-mounted devices, so as to control the vehicle.

In order to solve a technical problem that the driving route generated based on a single driving rule affects the driving experience of a user, an embodiment of the present disclosure provides a driving route planning method, which is applied to the electronic device 1 and can recommend a driving route based on a driving style of the user. The driving route can improve an accuracy of the driving route, making the planning of the driving route more in line with the driving style of the user, so as to effectively improve the driving experience.

Figure 2:
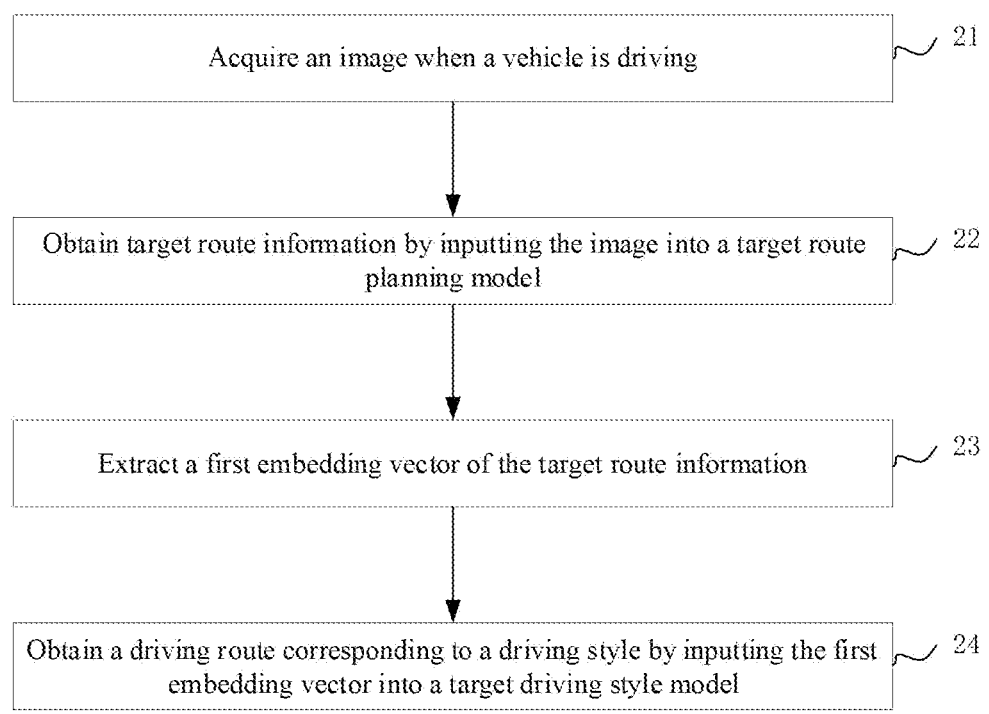
FIG. 2 is a flow chart of the driving route planning method provided by an embodiment of the present disclosure.

As shown in FIG. 2, it is a flow chart of the driving route planning method provided by the embodiment of the present disclosure. The driving route planning method described in this disclosure is applied in an electronic device (such as the electronic device 1 in FIG. 1). According to different requirements, an order of the blocks in the flowchart can be changed, and some blocks can be omitted.

Block 21, the electronic device acquires an image when the vehicle is driving.

In some embodiments of the present disclosure, the electronic device can acquire the image by controlling the camera device of the vehicle (for example, a driving recorder, or cameras installed at various positions of the vehicle, etc.) to capture a scene in front of the vehicle in real time. In other embodiments, the electronic device can control the camera device to capture a video of the scene in front of the vehicle, and obtain the image by extracting each frame of the video, so that the electronic device can analyze the image and obtain driving information related to the user.

Block 22, the electronic device obtains target route information by inputting the image into a target route planning model.

In an embodiment of the present disclosure, the image is input into the target route planning model, and then the target route information is output by the target route planning model, so that the target route information can be provided to the vehicle. For example, the electronic device uses the capture device to capture the image in front of the vehicle in real time. The electronic device inputs the image captured at a time t into the target route planning model, when the electronic device inputs the image captured at a time t+1 into the target route planning model, the target route planning model outputs the target route information that the vehicle has driven from the time t to the time t+1. Accordingly, when the electronic device inputs the image captured at a time t+2 into the target route planning model, the target route planning model outputs the target route information that the vehicle has driven from the time t to the time t+2.

Before inputting the image into the target route planning model, an initial route planning model may be trained to obtain the target route planning model, thereby improving the accuracy of the target route planning model outputting the target route information, wherein, the initial route planning model may be any one or a combination of a long short-term memory (LSTM), a recurrent neural network (RNN), a convolutional neural network (CNN), and other type of models.

Figure 3:
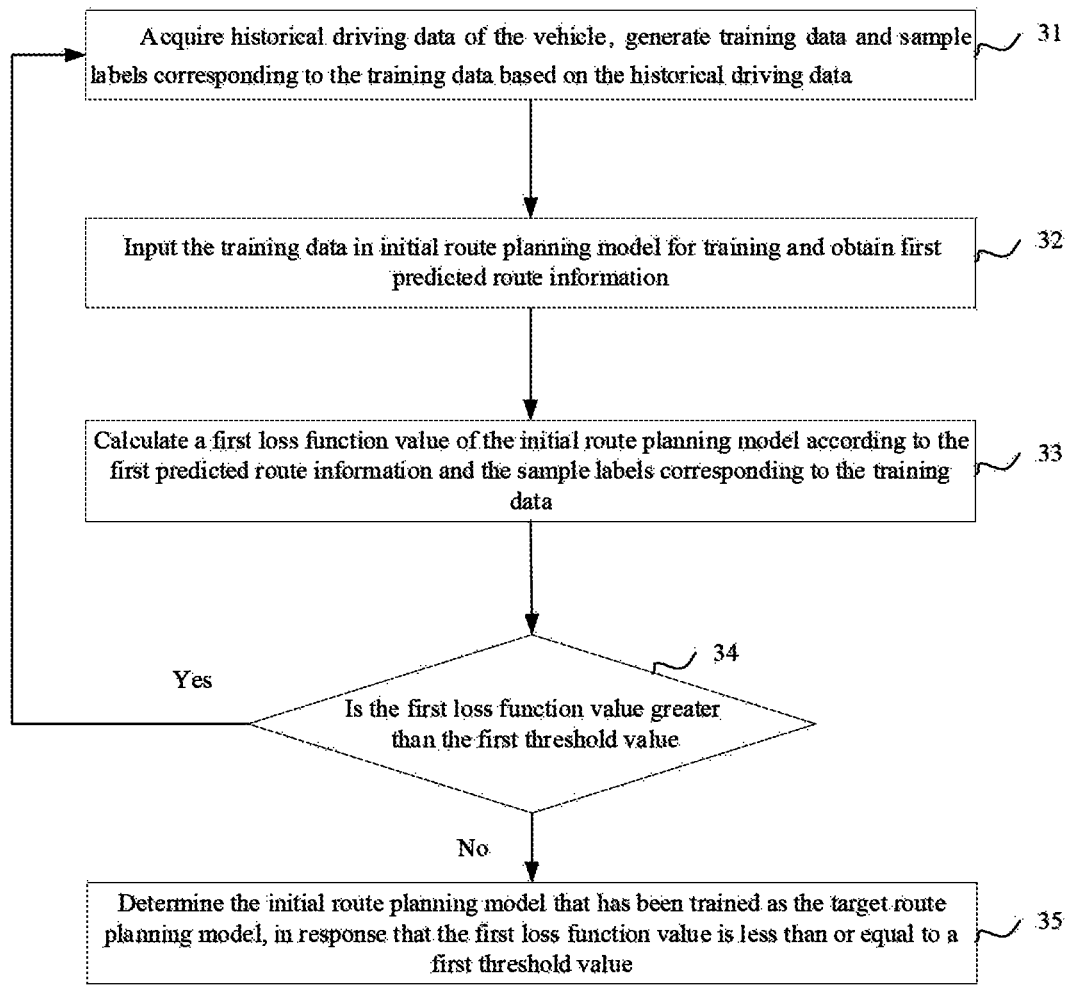
FIG. 3 is a flow chart of training a target route planning model provided by an embodiment of the present disclosure.

FIG. 3 is a flowchart of training the target route planning model provided by the embodiment of the present disclosure. As shown in FIG. 3, the training of the target route planning model includes the following blocks 31-35:

Block 31, the electronic device acquires historical driving data of the vehicle, generates training data and sample labels corresponding to the training data based on the historical driving data of the vehicle.

In some embodiments of the present disclosure, the electronic device establishes a data set of motion trajectory of the vehicle by obtaining the historical driving data of the vehicle, and the data set may include, but not limited to: obstacle information on a road on which the vehicle is driving, images captured by the capture device, and motion track information of the vehicle synthesized according to a global positioning system (GPS) and an inertial measurement unit (IMU) of the electronic device, wherein the GPS is used for measuring a driving speed, positioning information and current time information of the vehicle, and the MU is used to obtain information such as an acceleration and an angular velocity of the vehicle. Wherein, the historical driving data of the vehicle may be the driving data corresponding to a certain period of time that is specified by the user, for example, the driving data of the vehicle may be driving data corresponding to a period from March to June, or the driving data may be driving data corresponding to a certain area specified by the user. For example, the driving data of the vehicle may be driving data between a location A and a location B.

After the historical driving data is acquired, the historical driving data is preprocessed to generate the training data and the sample labels corresponding to the training data, wherein the sample labels corresponding to the training data may be real route information corresponding to the training data. For example, the training data may be images captured by the capture device at different times, and the sample labels corresponding to the training data may be route information synthesized according to the GPS and the IMU.

Block 32, the electronic device trains the initial route planning model and obtains first predicted route information using the training data.

In some embodiments of the present disclosure, the electronic device inputs the training data in initial route planning model for training and obtains the first predicted route information using the training data. In some embodiments of the present disclosure, the first predicted route information includes, but not limited to, a position of the vehicle when the vehicle at each of a plurality of time periods, a direction of a front of the vehicle, a driving speed of the vehicle, and a yaw rate of the vehicle, etc.

Block 33, the electronic device calculates a first loss function value of the initial route planning model according to the first predicted route information and the sample labels corresponding to the training data.

After the first predicted route information is obtained, the first loss function value of the initial route planning model can be calculated and the first loss function value can be used to determine whether or not to end the training of the initial route planning model. In other embodiments, whether or not to end the training of the initial route planning model may be determined based on a preset number of times of training (hereinafter "training times") the initial route planning model.

Specifically, the electronic device calculates a first error value between the first predicted route information and the sample labels corresponding to the training data, and the first error value is used as the first loss function value of the initial route planning model, wherein, the first error value may be calculated using Euclidean distance.

Block 34, the electronic device determines whether the first loss function value is less than or equal to a first threshold value.

Block 35, if the first loss function value is less than or equal to the first threshold value, the electronic device uses the initial route planning model that has been trained as the target route planning model.

In an embodiment of the present disclosure, the first threshold is preset as a criterion for measuring whether or not to end the training of the initial route planning model. If the first loss function value is less than or equal to the first threshold value, it indicates that the training of the initial route planning model can be ended, and the initial route planning model that has been trained can be used as the target route planning model.

Alternatively, based on the preset number of training times, if a current number of training times reaches the preset number of training times, it indicates that the training of the target route planning model can be ended.

If the first loss function value is greater than the first threshold value, return to block 31, and retrain the initial route planning model.

In the embodiment of the present disclosure, based on the preset first threshold value, if the first loss function value is greater than the first threshold value, it indicates that the training of the initial route planning model cannot be ended, and the execution returns to block 31.

Or, based on the preset number of training times, if the current number of training times do not reach the preset number of training times, the electronic device continues to train the initial route planning model.

During a driving process of the vehicle, the image acquired in real time may be input into the target route planning model, so that the target route planning model outputs the target route information based on the image.

Block 23, the electronic device extracts an embedding vector of the target route information (for clarity and simplicity describe the present disclosure, hereinafter referred to as "first embedding vector").

In the embodiment of the present disclosure, after obtaining the target route information based on the target route planning model, in order to avoid an influence of data noise, and better use the target route planning model to obtain the target route information, the electronic device can use an autoencoder to extract the first embedding vector of the target route information, wherein the autoencoder is used to learn a mapping relationship, so as to obtain a reconstruction vector, i.e., an embedding vector.

Before inputting the target route information into the autoencoder, in order to improve the accuracy of extracting the first embedding vector, the autoencoder may be pre-trained. After training the autoencoder, the electronic device inputs the target route information into the autoencoder, and the autoencoder encodes the target route information to obtain an encoded feature vector (to clarify this disclosure, hereinafter referred to as "first feature vector"), the first feature vector is mapped to an embedding space through a linear transformation, and according to all parameters, mapping matrices and bias weights included in a convolutional network, the first embedding vector corresponding to the first feature vector in the embedding space is calculated.

Exemplarily, the electronic device input a plurality of route information of the vehicle in a same area at different times into the autoencoder, and obtains from the autoencoder route info, matron that the vehicle have travelled in each location of the same area at different times, i.e., a location of the vehicle at different times, a direction of a front of the vehicle, the driving speed of the vehicle, and the yaw rate of the vehicle.

Block 24, the electronic device obtains a driving route corresponding to a driving style by inputting the first embedding vector into a target driving style model.

The first embedding vector is used as an input of the target driving style model to obtain the driving route corresponding to the driving style of the user. Before inputting the first embedding vector into the target driving style model, the initial target driving style model may be trained, so that the driving route output by the trained initial target driving style model is closer to the user's driving style, wherein, the trained initial target driving style model is the target driving style model, and the initial target driving style model may be one or a combination of a long short-term memory network (LSTM), a recurrent neural network (RNN), a convolutional neural networks (CNN).

In the disclosed embodiment, in order to improve the driving experience of the user, the driving route can be optimized in combination with the driving style of the user, so as to provide effective assistance to the driving of the vehicle. Further, when the vehicle is in the automatic driving mode, the driving route corresponding to the user's driving style can be provided according to the user's driving style, thereby effectively improving the user's driving experience.

Figure 4:
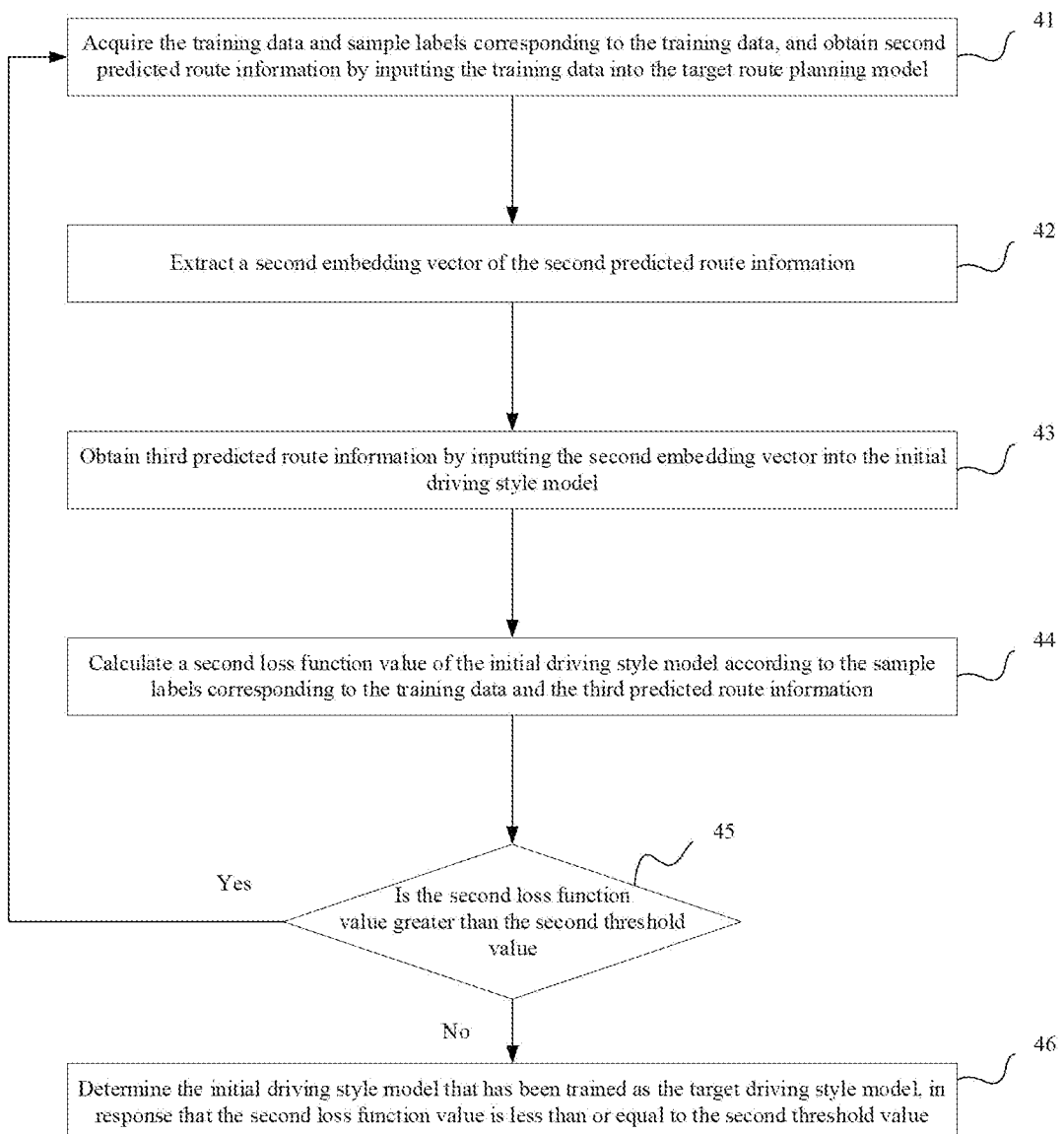
FIG. 4 is a flow chart of training a target driving style model provided by an embodiment of the present disclosure.

FIG. 4 is a flowchart of training the target driving style model provided by the disclosed embodiment, as shown in FIG. 4, the blocks of training the target driving style model are as follows:

Block 41, the electronic device acquires the training data and sample labels corresponding to the training data, and obtains second predicted route information by inputting the training data into the target route planning model.

In some embodiments of the present disclosure, after the target route planning model is obtained, the training data is input into the target route planning model, wherein the training data includes image information having a relationship of time sequence, and the second predicted route information corresponding to different me periods.

Block 42, the electronic device extracts an embedding vector of the second predicted route information (hereinafter referred to as "second embedding vector").

In some embodiments of the present disclosure, in order to remove the data noise in the second predicted route information corresponding to different time periods, the second predicted route information corresponding to different in e periods is input into the autoencoder, and the second predicted route information corresponding to different me periods is encoded to obtain an encoded feature vector (hereinafter referred to as "second feature vector" and the second feature vector is mapped to an embedding space through a linear transformation, and the second embedding vector corresponding to the second feature vector in the embedding space is calculated according to all parameters, mapping matrices, and bias weights included in the convolutional network, the second embedding vector includes a position of the vehicle when the vehicle at each of a plurality of time periods, a direction of a front of the vehicle, a driving speed, and yaw rate of the vehicle.

Block 43, the electronic device obtains third predicted route information by inputting the second embedding vector into the initial driving style model.

After obtaining the second embedding vector, the second embedding vector is used as training data for training the initial driving style model, the electronic device inputs the second embedding vector into the initial driving style model for training, and generates the third predicted route information that conforms to the driving style of the user.

Block 44, the electronic device calculates a second loss function value of the initial driving style model according to the sample labels corresponding to the training data and the third predicted route information.

In order to judge whether the third preset route information conforms to the driving style of the user, the second loss function value of the initial driving style model is calculated using Euclidean distance. In an embodiment, the electronic device may determine whether or not to end the training of the initial driving style model based on the value of the second loss function. In other embodiments, the electronic device may determine whether or not to end the training of the initial driving style model based on a preset number of training times of training the initial driving style model.

Block 45, the electronic device determines whether the second loss function value is less than or equal to a second threshold value.

Block 46, if the second loss function value is less than or equal to the second threshold value, the electronic device determines the initial driving style model that has been trained as the target driving style model.

In the embodiment of the present disclosure, the second threshold value is preset as a criterion to measure whether the training of the initial driving style model can be ended. If the second loss function value is less than or equal to the second threshold value, the electronic device determines that the training of the initial driving style model can be ended, and the trained initial driving style model can be used as the target driving style model.

Alternatively, if a current number of training times of training the initial driving style model reaches a preset number of training times, the electronic device determines that the training of the initial driving style model can be ended.

If the second loss function is greater than the second threshold value, return to block 41 and retrain the initial driving style model.

In an embodiment of the present disclosure, based on the preset second threshold value, if the second loss function value is greater than the second threshold, it indicates that the training of the initial driving style model cannot be ended, and the process returns to block 41.

Or, if the current number of training times of training the initial driving style model does not reach the preset number of training times, continue to train the initial driving style model.

After it is determined that the training of the initial driving style model is completed, the target driving style model is obtained, and the target driving style model is used to generate a driving route meeting the driving style of the user, so as to improve driving experience.

This disclosure improves the accuracy of obtaining target route information by training the target route planning model, and filters out the data noise in the target route information by extracting the embedding vector of the target route information, and further trains the target driving style model, the obtained driving route is more in line with the driving style of the user, and the automatic driving experience of the user is improved.

Please continue to refer to FIG. 1, in this embodiment, the storage device 11 may be an internal memory of the electronic device 1, that is, a storage device internally configured in the electronic device 1. In other embodiments, the storage device 11 may be an external storage device of the electronic device 1, that is, a storage device externally connected to the electronic device 1.

In some embodiments, the storage device 11 is used to store program codes and various data, and realize high-speed and automatic program or data access during the operation of the electronic device 1.

The storage device 11 may include a random access memory, a non-volatile memory, such as a hard disk, a memory, a plug-in hard disk, a smart memory card (SMC), a secure digital (SD) card, a flash memory card (Flash Card), at least one magnetic disk storage device, a flash memory device, or any other volatile solid-state storage devices.

In one embodiment, the processor 12 may be a central processing unit (CPU), or may be other general-purpose processors, a digital signal processor (DSP), an application specific integrated circuits (ASIC), a Field-Programmable Gate Array (FPGA) or other programmable logic devices, discrete gate or transistor logic devices, discrete hardware materials, etc. The general-purpose processor may be a microprocessor, or the processor may be any other conventional processor and the like.

If the program codes and various data in the storage device 11 are implemented in the form of software function units and sold or used as independent products, they can be stored in a computer-readable storage medium. Based on this understanding, this disclosure implements all or part of the processes in the methods of the above embodiments, such as the driving route planning method, which can also be completed by instructing related hardware through computer programs, and the computer programs can be stored in computer-readable storage medium, when the computer program is executed by a processor, the blocks of the above-mentioned various method embodiments can be realized. Wherein, the computer program includes computer program code, and the computer program code may be in the form of source code, object code, executable file or some intermediate form. The computer readable medium may include: any entity or device capable of carrying the computer program code, recording medium, U disk, removable hard disk, magnetic disk, optical disk, computer memory, read-only memory (ROM).

It can be understood that the dividing of the modules described above is a logical function division, and there may be another division method in actual implementation. In addition, each functional module in each embodiment of the present disclosure may be integrated into the same processing unit, or each module may exist separately physically, or two or more modules may be integrated into the same unit. The above-mentioned integrated modules can be implemented in the form of hardware, or in the form of hardware plus software function modules.

Finally, it should be noted that the above embodiments are only used to illustrate the technical solutions of the present disclosure and not to limit them. Although the present disclosure has been described in detail with reference to the preferred embodiments, those skilled in the art should understand that the technical solutions of the present disclosure can be Modifications or equivalent replacements may be made without departing from the spirit and scope of the technical solutions disclosed herein.

What is claimed is:

1. A driving route planning method applied to an electronic device, the method comprising:
   acquiring images when a vehicle is driving by a user;
   obtaining target route information that the vehicle has driven by inputting the images into a target route planning model;
   extracting a first embedding vector of the target route information;
   obtaining a driving route corresponding to a driving style of the user by inputting the first embedding vector into a target driving style model; and
   providing the driving route corresponding to the driving style of the user when the vehicle is in an automatic driving mode;
   wherein the method further comprises: obtaining the target driving style model by training an initial driving style model based on training data and the target route planning model, comprising:
   obtaining second predicted route information by inputting the training data into the target route planning model; extracting a second embedding vector of the second predicted route information; obtaining third predicted route information by inputting the second embedding vector into the initial driving style model; calculating a second loss function value of the initial driving style model according to sample labels corresponding to the training data and the third predicted route information; determining the initial driving style model that has been trained as the target driving style model, in response that the second loss function value is less than or equal to a second threshold value; and continuing to train the initial driving style model in response that the second loss function value is greater than the second threshold value;
   wherein the training data comprises image information having a relationship of time sequence, wherein the obtaining of the second predicted route information by inputting the training data into the target route planning model comprises: obtaining the second predicted route information corresponding to different time periods by inputting the image information having the relationship of time sequence into the target route planning model;
   wherein the method further comprises: inputting the second predicted route information corresponding to different time periods into an autoencoder, and obtaining a second encoded feature vector; mapping the second encoded feature vector to an embedding space through a linear transformation; and calculating the second embedding vector corresponding to the second encoded feature vector in the embedding space, wherein the second embedding vector comprises a position of the vehicle when the vehicle is at each of a plurality of time periods, a direction of a front of the vehicle, a driving speed, and yaw rate of the vehicle.

2. The driving route planning method according to claim 1, wherein before obtaining the image, the method further comprises:
acquiring historical driving data of the vehicle;
generating the training data and the sample labels corresponding to the training data based on the historical driving data;
obtaining the target route planning model by training an initial route planning model using the training data.

3. The driving route planning method according to claim 2, wherein the obtaining of the target route planning model by training the initial route planning model using the training data comprises:
inputting the training data in the initial route planning model for training and obtaining first predicted route information;
calculating a first loss function value of the initial route planning model according to the first predicted route information and the sample labels corresponding to the training data;
determining the initial route planning model that has been trained as the target route planning model, in response that the first loss function value is less than or equal to a first threshold value; and
continuing to train the initial route planning model in response that the first loss function value is greater than the first threshold value.

4. The driving route planning method according to claim 2, wherein the training data comprises images captured at different times, and the sample labels corresponding to the training data comprise route information synthesized according to a global positioning system and an inertial measurement unit.

5. An electronic device comprising:
a storage device;
at least one processor; and
the storage device storing one or more programs, which when executed by the at least one processor, cause the at least one processor to:
acquire images when a vehicle is driving by a user;
obtain target route information that the vehicle has driven by inputting the images into a target route planning model;
extract a first embedding vector of the target route information;
obtain a driving route corresponding to a driving style of the user by inputting the first embedding vector into a target driving style model; and
provide the driving route corresponding to the driving style of the user when the vehicle is in an automatic driving mode;
wherein the at least one processor is further caused to:
obtain the target driving style model by training an initial driving style model based on training data and the target route planning model, comprising: obtain second predicted route information by inputting the training data into the target route planning model; extract a second embedding vector of the second predicted route information; obtain third predicted route information by inputting the second embedding vector into the initial driving style model; calculate a second loss function value of the initial driving style model according to the sample labels corresponding to the training data and the third predicted route information; determine the initial driving style model that has been trained as the target driving style model, in response that the second loss function value is less than or equal to a second threshold value; and continue to train the initial driving style model in response that the second loss function value is greater than the second threshold value;
wherein the training data comprises image information having a relationship of time sequence, wherein the obtaining of the second predicted route information by inputting the training data into the target route planning model comprises: obtaining the second predicted route information corresponding to different time periods by inputting the image information having the relationship of time sequence into the target route planning model;
wherein the at least one processor is further caused to: input the second predicted route information corresponding to different time periods into an autoencoder, and obtaining a second encoded feature vector; map the second encoded feature vector to an embedding space through a linear transformation; and calculate the second embedding vector corresponding to the second encoded feature vector in the embedding space, wherein the second embedding vector comprises a position of the vehicle when the vehicle is at each of a plurality of time periods, a direction of a front of the vehicle, a driving speed, and yaw rate of the vehicle.

6. The electronic device according to claim 5, wherein before the at least one processor obtaining the image, the at least one processor is further caused to:
acquire historical driving data of the vehicle;
generate the training data and the sample labels corresponding to the training data based on the historical driving data;
obtain the target route planning model by training an initial route planning model using the training data.

7. The electronic device according to claim 6, wherein the obtaining of the target route planning model by training the initial route planning model using the training data comprises:
inputting the training data in the initial route planning model for training and obtaining first predicted route information;
calculating a first loss function value of the initial route planning model according to the first predicted route information and the sample labels corresponding to the training data;
determining the initial route planning model that has been trained as the target route planning model, in response that the first loss function value is less than or equal to a first threshold value; and
continuing to train the initial route planning model in response that the first loss function value is greater than the first threshold value.

8. The electronic device according to claim 6, wherein the training data comprises images captured at different times, and the sample labels corresponding to the training data comprise route information synthesized according to a global positioning system and an inertial measurement unit.

9. A non-transitory storage medium having instructions stored thereon, when the instructions are executed by a processor of an electronic device, the processor is caused to perform a driving route planning method, wherein the method comprises:

acquiring images when a vehicle is driving by a user;

obtaining target route information that the vehicle has driven by inputting the images into a target route planning model;

extracting a first embedding vector of the target route information;

obtaining a driving route corresponding to a driving style of the user by inputting the first embedding vector into a target driving style model; and providing the driving route corresponding to the driving style of the user when the vehicle is in an automatic driving mode;

wherein the method further comprises: obtaining the target driving style model by training an initial driving style model based on training data and the target route planning model, comprising: obtaining second predicted route information by inputting the training data into the target route planning model; extracting a second embedding vector of the second predicted route information; obtaining third predicted route information by inputting the second embedding vector into the initial driving style model; calculating a second loss function value of the initial driving style model according to the sample labels corresponding to the training data and the third predicted route information; determining the initial driving style model that has been trained as the target driving style model, in response that the second loss function value is less than or equal to a second threshold value; and continuing to train the initial driving style model in response that the second loss function value is greater than the second threshold value;

wherein the training data comprises image information having a relationship of time sequence, wherein the obtaining of the second predicted route information by inputting the training data into the target route planning model comprises: obtaining the second predicted route information corresponding to different time periods by inputting the image information having the relationship of time sequence into the target route planning model;

wherein the method further comprises: inputting the second predicted route information corresponding to different time periods into an autoencoder, and obtaining a second encoded feature vector; mapping the second encoded feature vector to an embedding space through a linear transformation; and calculating the second embedding vector corresponding to the second encoded feature vector in the embedding space, wherein the second embedding vector comprises a position of the vehicle when the vehicle is at each of a plurality of time periods, a direction of a front of the vehicle, a driving speed, and yaw rate of the vehicle.

10. The non-transitory storage medium according to claim 9, wherein before obtaining the image, the method further comprises:

acquiring historical driving data of the vehicle;

generating the training data and the sample labels corresponding to the training data based on the historical driving data;

obtaining the target route planning model by training an initial route planning model using the training data.

11. The non-transitory storage medium according to claim 10, wherein the obtaining of the target route planning model by training the initial route planning model using the training data comprises:

inputting the training data in the initial route planning model for training and obtaining first predicted route information;

calculating a first loss function value of the initial route planning model according to the first predicted route information and the sample labels corresponding to the training data;

determining the initial route planning model that has been trained as the target route planning model, in response that the first loss function value is less than or equal to a first threshold value; and continuing to train the initial route planning model in response that the first loss function value is greater than the first threshold value.

* * * * *